United States Patent [19]

Harris

[11] Patent Number: 4,861,909

[45] Date of Patent: Aug. 29, 1989

[54] ISOCYANATE-MODIFIED POLY(ALKYLENE CARBONATE) POLYAHLS

[75] Inventor: Robert F. Harris, Midland, Mich.

[73] Assignee: The Dow Chemical Company, Midland, Mich.

[21] Appl. No.: 18,267

[22] Filed: Feb. 24, 1987

Related U.S. Application Data

[63] Continuation-in-part of Ser. No. 850,788, Apr. 11, 1986, Pat. No. 4,709,069.

[51] Int. Cl.$^4$ .................... C07C 69/96; C08G 63/62
[52] U.S. Cl. .................... 558/267; 521/159; 525/453; 528/370; 558/260; 558/262; 558/265; 558/266; 558/268; 558/269
[58] Field of Search .............. 521/172, 173, 159; 528/76, 77, 196, 271, 370; 525/453; 558/260, 262, 265, 266, 267, 268, 269

[56] References Cited

U.S. PATENT DOCUMENTS

| | | | |
|---|---|---|---|
| 3,248,414 | 4/1966 | Stevens | 558/260 |
| 3,284,479 | 11/1966 | Windemuth et al. | 558/260 X |
| 3,394,164 | 7/1968 | McClellan et al. | 558/260 X |
| 3,567,763 | 3/1971 | Emmons | 558/260 X |
| 4,089,835 | 5/1978 | Konig et al. | 252/308 X |
| 4,105,641 | 8/1978 | Buysch et al. | 526/712 |
| 4,125,522 | 11/1978 | Becker | 528/61 |
| 4,191,705 | 3/1980 | Lindner et al. | 558/260 |
| 4,202,957 | 5/1980 | Bonk et al. | 528/77 |
| 4,267,120 | 5/1981 | Cuscurida et al. | 558/260 |
| 4,435,527 | 3/1984 | Cuscurida | 521/173 |
| 4,476,293 | 10/1984 | Robinson | 528/76 |
| 4,528,364 | 7/1985 | Prier | 528/370 |

OTHER PUBLICATIONS

Kohler et al., *J. Am. Chem. Soc.*, 49, 3181–3188 (1927).

*Primary Examiner*—Werren B. Lone
*Assistant Examiner*—Vera C. Clarke

[57] ABSTRACT

Isocyanate-modified poly(alkylene carbonate) polyahls comprising the residue of at least one polyahl, at least one isocyanate modifier, poly(alkyleneoxy) units, poly(alkylene carbonate) units, and a plurality of active hydrogen end groups are disclosed. Also disclosed are isocyanate-functional prepolymer compositions of these isocyanate-modifed poly(alkylene carbonate) polyahls, which contain the residue of at least one isocyanate-modified poly(alkylene carbonate) polyahl of this invention and excess organic polyisocyanate units. Urethane/urea polymers formed by the reactions of the isocyanate-functional prepolymers with polyahls are also disclosed. Also disclosed are urethane/urea polymers comprising the residue of at least one isocyanate-modified poly(alkylene carbonate) polyahl of this invention, the residue of a polyisocyanate and the residue of at least one other polyahl selected from the group consisting of polyamines and polyfunctional hydroxyl compounds. The novel compositions of this invention are useful in urethane/urea polymer applications such as foams, elastomers, plastics, adhesives, coatings and the like.

29 Claims, No Drawings

ISOCYANATE-MODIFIED POLY(ALKYLENE CARBONATED POLYAHLS

CROSS-REFERENCE TO RELATED APPLICATIONS

This application is a continuation-in-part of U.S. patent application Ser. No. 850,788 filed Apr. 11, 1986, now U.S. Pat. No. 4,709,069, and is a related application to U.S. patent applications Ser. No. 831,761 filed Feb. 21, 1986, now U.S. Pat. No. 4,689,353; Ser. No. 931,597 filed Nov. 16, 1986, now U.S. Pat. No. 4,795,810; and Ser. No. 931,498 filed Nov. 16, 1986, now U.S. Pat. No. 4,816,529.

FIELD OF THE INVENTION

This invention relates to polymeric compositions containing a poly(alkylene carbonate) backbone.

BACKGROUND OF THE INVENTION

Polyether polyols and polyester polyols are well-known polymers which can be further polymerized with organic polyisocyanates to prepare polyurethanes. Polyether polyols are prepared by the reaction of hydroxy-containing hydrocarbons, such as an aromatic or aliphatic diol or triol, and epoxides, e.g., ethylene oxide and propylene oxide. Polyester polyols are prepared by the reaction of polyacids, such as adipic or terephthalic acid, or esters of polyacids, such as dimethyl adipate or dimethyl terephthalate with dihydroxy-containing hydrocarbons, such as aromatic and aliphatic diols and triols. Some poly(alkylene carbonate) polyol properties resemble polyester polyol properties while other properties resemble polyether polyols.

It is known to prepare polycarbonates from aliphatic dihydroxyl compounds either by a process of phosgenation in which hydrogen chloride is liberated or bound by bases, such as pyridine or quinoline, or by a process of transesterification with carbonic acid esters of alcohols or phenols, preferably diphenylcarbonate, optionally with the aid of transesterification catalysts. In either case, it is essential to use phosgene or a mixture of carbon monoxide and chlorine as the source of carbonic acid. Technical processes which involve the preparation and handling of phosgene are difficult and costly on account of considerable safety risks involved and the high cost of materials due to corrosion. To this are added ecological problems since either the spent air is contaminated with hydrogen chloride or the effluent water is contaminated with sodium chloride.

Polycarbonates produced by these methods, using dihydrocarbyl compounds, may have a functionality of less than two due to inadequate or incomplete esterification or transesterification which often prevents the products from forming high molecular weight polymers in subsequent reactions.

U.S. Pat. Nos. 3,248,414; 3,248,415 and 3,248,416 to Stevens disclosed the preparation of poly(alkylene carbonate) polyols from
(1) carbon dioxide and 1,2-epoxides;
(2) cyclic carbonates such as ethylene carbonate; or
(3) cyclic carbonates and a 1,2-epoxide.
A minor amount of a polyol is employed therein as an initiator. The reaction is usually conducted in the presence of a metal carbonate, metal hydroxide, trisodium phosphate or tertiary amine.

Poly(alkylene carbonate) polyols have also been prepared by polymerization of ethylene carbonates under pressure using basic catalysts and a minor amount of glycol as initiator as disclosed in U.S. Pat. No. 4,105,641 to Buysch et al. These products are low in carbonate and high in ether group concentration due to decomposition of the ethylene carbonate. In the Stevens patents discussed hereinbefore, a poly(alkylene carbonate) polyol derived from ethylene carbonate and monoethylene glycol was exposed to temperatures of 160° C. at 2 mm Hg of pressure to remove unreacted ethylene carbonate. In U.S. Pat. No. 3,379,693, Hostetler removed unreacted ethylene carbonate from products similar to poly(alkylene carbonate) polyols by heating to about 130° C. under a pressure of 1–5 mm Hg. In U.S. Pat. No. 3,896,090 to Maximovich, ethylene carbonate was reacted with diethylene glycol and the reaction product treated under reduced pressure to remove the unreacted ethylene carbonate and diethylene glycol.

Several workers have prepared poly(alkylene carbonate) polyols and related materials by controlling the equilibrium between the reaction materials of a diol and alkylene carbonate and the products of a poly(alkylene carbonate) polyol and monoethylene glycol. The reaction is controlled by the removal of monoethylene glycol.

In U.S. Pat. No. 3,133,113 to Malkemus, ethylene carbonate and diethylene glycol were reacted at 125° C. to 130° C. under a reduced pressure of 100 mm Hg in the presence of certain catalysts with concurrent removal of monoethylene glycol as a distillate. The catalyst employed was a mixed zinc borate-alkaline earth metal oxide catalyst. This was followed by removal of starting material. The Malkemus procedure is plagued by the presence of volatile ethylene carbonate which condenses as a solid throughout the system causing severe plugging and reducing ethylene carbonate conversion while monoethylene glycol is being removed. This process requires large excesses of ethylene carbonate.

In U.S. Pat. No. 3,313,782 to Springmann et al., this process was further studied under reduced pressure in the presence of catalysts, and limits on the reaction conditions were set. The reaction temperatures must be lower in this process than the boiling point of the alkylene carbonate, but still high enough to distill off the monoethylene glycol formed.

U.S. Pat. No. 4,131,731 to Lai et al. used stage reductions in pressure during the reaction of alkylene carbonate with a diol. The final stage of the Lai et al. process is intended to remove monoethylene glycol. The patentees characterized their reaction conditions by stating that the alkylene carbonate must have a boiling point 4.9° C. greater than monoethylene glycol. The chemistry based on the above equilibrium was improved upon by U.S. Pat. No. 4,105,641 to Buysch et al. where the reactions were carried out in a solvent (e.g., cumene) capable of removing monoethylene glycol as an azeotrope with the solvent.

Heretofore, the molecular weights of poly(alkylene carbonate) polyols from alkylene carbonates have been controlled by either the stoichiometry of the reactants, that is, higher alkylene carbonate to initiator ratios for higher molecular weights, or the removal of monoethylene glycol from the reaction mixture with an ethylene carbonate to initiator equivalent ratio of about 1. Catalysts are used in most cases since reaction rates are very slow in the absence of a catalyst. When high alkylene carbonate to initiator ratios are used to make higher molecular weight poly(alkylene carbonate) polyols, reaction rates drop severely as higher conversions are approached. In these cases, long reaction times are required and the products are contaminated by unreacted alkylene carbonate. If temperatures are increased to increase the rate, product decomposition occurs with $CO_2$ loss.

In view of the deficiencies of the conventional poly(alkylene carbonate) polyahls, it would be highly desirable to provide poly(alkylene carbonate) polyahls having improved physical and chemical properties.

SUMMARY OF THE INVENTION

In one aspect, this invention is a new, isocyanate-modified poly(alkylene carbonate) polyahl which is a polymer comprising (1) a backbone having (a) the residue of at least one polyahl initiator, (b) the residue of at least one polyisocyanate, (c) a plurality of poly(alkyleneoxy) moieties, (d) a plurality of poly(alkylene carbonate) moieties; and (2) a plurality of active hydrogen end groups.

In a second aspect, this invention is an isocyanate-functional prepolymer composition of the isocyanate-modified poly(alkylene carbonate) polyahl formed by reaction of the isocyanate-modified poly(alkylene carbonate) polyahl with an excess of one or more polyisocyanates.

In a third aspect, this invention is a novel urethane/urea polymer formed by the reactions of the isocyanate-functional prepolymer composition with any polyahl.

In a fourth aspect, this invention is a novel urethane/urea polymer formed by the reactions of the novel, isocyanate-modified poly(alkylene carbonate) polyahl of this invention with polyisocyanates, optionally in the presence of other polyahls.

The introduction of the residue of an isocyanate into the backbone of the poly(alkylene carbonate) polyahl allows adjustment of the physical and chemical properties of the poly(alkylene carbonate) polyahl to maximize its effectiveness in specific applications. For example, the isocyanate-modified polyahls of this invention are useful for producing materials for applications in flexible urethane foams, urethane coatings, rigid urethane foams, urethane/urea elastomers and plastics, adhesives, polymeric coatings and surfactants among others. In some systems property improvements include increased modulus, increased strength, improved elongation to break, improved solvent resistance and increased hardness when compared to the corresponding systems without the isocyanate modification.

DETAILED DESCRIPTION OF THE INVENTION

The starting materials for the novel compositions of this invention are poly(alkylene carbonate) polyahls and polyisocyanates.

Poly(alkylene carbonate) polyahls are randomized polymers having a plurality of carbonate moieties and a plurality of active hydrogen moieties and optionally other moieties such as di- and higher polyalkyleneoxy units. An alkylene carbonate moiety is a repeating unit which has an alkylene group bound to a carbonate moiety. An active hydrogen moiety is a moiety containing a hydrogen atom which because of its position in the moiety displays significant activity according to the Zerewitinoff test described by Kohler in the Journal of American Chemical Society, Vol. 49, p. 3181 (1927). Illustrative of such active hydrogen moieties are —COOH, —OH, —NH$_2$, —NH—, —CONH$_2$, —SH and —CONH—. Alkyleneoxy moiety refers herein to a repeating unit which has an alkylene group bound to oxygen. Alkylene carbonate and alkyleneoxy moieties are respectively represented by the following formulae:

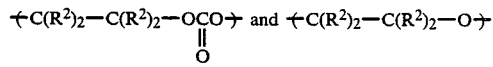

wherein $R^2$ is as hereinafter defined.

Preferred poly(alkylene carbonate) polyahls are random polyols represented by the formula:

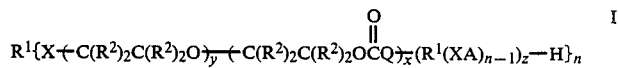

wherein $R^1$ is separately in each occurrence an n-valent hydrocarbon radical or hydrocarbon radical which can contain one or more heteroatoms of O, N or S;

$R^2$ is separately in each occurrence hydrogen, halogen, a nitro group, a cyano group, a $C_{1-20}$ hydrocarbyl group or a $C_{1-20}$ hydrocarbyl group substituted with one or more of the following: a halo, cyano, nitro, thioalkyl, tert-amino, alkoxy, aryloxy, aralkoxy, carbonyldioxyalkyl, carbonyldioxyaryl, carbonyldioxyaralkyl, alkoxycarbonyl, aryloxycarbonyl, aralkoxycarbonyl, alkylcarbonyl, arylcarbonyl, aralkylcarbonyl, alkylsulfinyl, arylsulfinyl, aralkylsulfinyl, alkylsulfonyl, arylsulfonyl, or aralkylsulfonyl group;

X is separately in each occurrence S, O, NH,

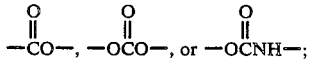

A is separately in each occurrence

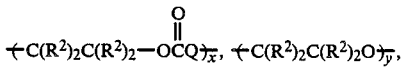

combinations thereof or a covalent bond;

Q is separately in each occurrence O, S or NH provided that all carbonate moieties are internal because terminal carbonate moieties are unstable and form OH moieties by the elimination of $CO_2$;

n is separately in each occurrence an integer of from 1 to 25;

x is separately in each occurrence an integer of from 1 to 40;

y is separately in each occurrence an integer of from 1 to 120; and z is separately in each occurrence an integer of from 0 to 5.

A more preferred class of poly(alkylene carbonate) polyahls are poly(alkylene carbonate) polyols generally corresponding to the aforementioned formula wherein $R^1$, $R^2$ and n are as previously defined; X is oxygen; x is separately in each occurrence an integer from 2 to 10; y is separately in each occurrence an integer from 5 to 15; and z is an integer from 0 to 2; provided that the ratio of y to x is from 1:1 to 3:1.

In the hereinbefore-defined formulae, $R^1$ is preferably an aliphatic or cycloaliphatic hydrocarbon containing one or more oxygen, nitrogen or sulfur moieties; $R^1$ is more preferably an n-valent alkane or cycloalkene, or an n-valent alkane or cycloalkane containing one or more oxygen, nitrogen or sulfur moieties; $R^1$ is even more preferably an n-valent $C_{1-10}$ alkane or an n-valent $C_{1-10}$ alkane substituted with one or more oxygen moieties. $R^2$ is preferably hydrogen, $C_{1-20}$ alkyl, $C_{1-20}$ haloalkyl, $C_{1-20}$ alkenyl or phenyl; $R^2$ is more preferably hydrogen, $C_{1-3}$ alkyl, $C_{2-3}$ alkenyl, or phenyl; $R^2$ is even more preferably hydrogen, methyl or ethyl; $R^2$ is even more preferably hydrogen or methyl, and, most preferably, hydrogen. X is preferably S, O or NH; X is most preferably O. Preferably, n is an integer of 1 to 10, inclusive; more preferably, 1 to 5, inclusive; and, most preferably, 1 or 2.

As used herein, the term "polyahl" includes any polyfunctional compound having on average more than 1 active hydrogen moiety as defined hereinbefore. Specifically included within the definition of polyahl are polyols, polyamines, polyamides, polymercaptans and polyacids. Examples of polyahls suitable for use in the instant invention may be found in U.S. Pat. No. 4,465,713 at column 2, line 42 through column 5, line 17.

Poly(alkylene carbonate) polyahl starting materials useful in this invention are prepared by any method known in the art, such as the condensation of an alkylene carbonate, carbon dioxide and an alkylene oxide, or mixtures of an alkylene carbonate, an alkylene oxide and/or $CO_2$, with an organic compound containing one or more active hydrogen atoms (initiator) in the presence of an alkaline catalyst or metal salt of an alkaline compound. Examples of these poly(alkylene carbonate) polyols and methods for preparation of these polyols are contained in Maximovich (U.S. Pat. Nos. 3,896,090 and 3,689,462), Springmann (U.S. Pat. No. 3,313,782), Stevens (U.S. Pat. Nos. 3,248,416; 3,248,415; and 3,248,414), and copending application Ser. No. 750,362, all incorporated herein by reference. Alternatively, the poly(alkylene carbonate) polyols can be prepared by reacting a dialkyl carbonate or diaryl with an initiator with two or more hydroxyl moieties. See, for example, U.S. Pat. Nos. 4,476,293 and 4,191,705, incorporated herein by reference.

The poly(alkylene carbonate) polyahls used as starting materials may also contain the residue of an initiator as well as unreacted starting materials and other relatively volatile reaction products.

The organic compound containing active hydrogen atoms (the initiator) is a hydrocarbon or hydrocarbon which is substituted with one or more heteroatoms of oxygen, nitrogen or sulfur containing between 1 and 25 functional groups containing between 1 and 25 functional groups containing a reactive hydrogen. Among the desirable initiators are those which correspond to the formula $R^3$$(XH)_n$ wherein $R^3$, X and n are as hereinbefore defined. A functional group containing a reactive hydrogen means herein any moiety which contains a hydrogen atom which will readily react with an alkylene carbonate, a dialkyl carbonate, diaryl carbonate or an alkene oxide in the presence of carbon dioxide. More specifically, reactive hydrogen means herein a hydrogen linked directly to an oxygen, nitrogen or sulfur atom, such as is found in a hydroxy, non-tertiary amine, amide, mercapto or carboxyl group.

The organic compounds containing active hydrogen atoms of this invention (the initiator) contain one or more of the following functional groups, hydroxyls, amines, mercaptans, carboxyls, sulfones, amides, imides, or carbonates. In addition, the initiators may contain other groups in their backbone structure, such as, sulfones, sulfoxides, sulfides, amines, amides, ethers, esters, carbonates and the like.

Among desirable initiators are polyols such as aliphatic polyether and polyester polyols, cycloaliphatic polyols, aromatic polyols and polyols which further contain oxy or ether groups; polyamines; polymercaptans; polyamides; polycarboxylic acids; water, alkylolamines and organic compounds which contain two or more of the above-described functional groups containing reactive hydrogens. The preferred classes are the polyols, polyamines and polymercaptans. Examples of active hydrogen-containing compounds include those described in the U.S. patents incorporated by reference hereinbefore. Two or more initiators can be used in combination to obtain a poly(alkylene carbonate) polyol.

Catalysts used in the preparation of polyether polyols include alkali metal hydroxides, alkaline earth metal hydroxides, alkali metal carbonates, alkaline earth metal carbonates, ammonium hydroxide and ammonium carbonate.

Preferable catalysts for the reaction of an active hydrogen-containing organic compound with an alkylene carbonate, dialkyl carbonate, diaryl carbonate, alkylene oxide and carbon monoxide, or alkylene carbonate in admixture with an alkylene oxide and/or carbon dioxide include ester exchange catalysts. Among preferable catalysts are such metals as lithium, sodium, potassium, rubidium, cesium, magnesium, calcium, strontium, barium, zinc, aluminum, titanium, cobalt, germanium, tin, lead, antimony, arsenic and cerium as well as the alkoxides thereof. Examples of other preferable catalysts are alkali metal carbonates, alkaline earth metal carbonates, ammonium carbonates, alkali metal borates, alkaline earth metal borates, ammonium borates, hydrocarbyloxy titanates, zinc borate, lead borate, zinc oxide, lead silicate, lead arsenate, litharge, lead carbonate, antimony trioxide, germanium dioxide, cerium trioxide and aluminum isopropoxide. Examples of other preferable catalysts include salts of organic acids of magnesium, calcium, cerium, barium, zinc and titanium, alkali metal stannates, alkaline metal stannates and ammonium stannates.

Examples of borate catalysts include sodium meta-borate, sodium meta-borate tetrahydrate, sodium meta-borate dihydrate, sodium pentaborate pentahydrate, sodium tetraborate decahydrate, sodium tetraborate pentahydrate, diammonium tetraborate tetrahydrate, ammonium hydrogen tetraborate tetrahydrate, lithium ortho-dihydroborate, lithium meta-borate, lithium tetraborate, lithium pentaborate pentahydrate, potassium meta-borate, potassium tetraborate tetrahydrate, potassium tetraborate pentahydrate, potassium pentaborate tetrahydrate, magnesium meta-borate trihydrate, magnesium diborate, magnesium ortho-borate, calcium meta-borate, calcium tetraborate and strontium tetraborate tetrahydrate. Examples of stannate catalysts include sodium stannate trihydrate, potassium stannate trihydrate, potassium stannate monohydrate, barium stannate trihydrate, magnesium stannate trihydrate and the like.

More preferred catalysts are the alkali metal carbonates, alkaline earth metal carbonates, ammonium carbonates, alkali metal stannates, alkaline earth metal stannates, alkali metal borates, alkaline earth metal borates and ammonium borates. Even more preferred catalysts are alkali metal carbonates, alkali metal borates and alkali metal stannates. Most preferred catalysts are potassium carbonate, sodium meta-borate and sodium stannate.

The choice of catalyst affects the percentage of carbon dioxide units in the poly(alkylene carbonate) polyol. Generally, the poly(alkylene carbonate) polyol contains between about 5 and 35 weight percent of the carbon dioxide. The use of most of the catalysts described hereinbefore results in a poly(alkylene carbonate) polyol in which about 10 percent of the units are carbon dioxide units, whereas the use of sodium meta-borate results in about 25 percent carbon dioxide units, and the use of sodium stannate results in about 30 to 50 percent carbon dioxide units. In this context, percent means the percentage of the carbon dioxide units based on the total of the carbon dioxide units and the alkyleneoxy units.

A suitable amount of the catalyst is any amount which is catalytic under the reaction conditions. Preferable catalyst concentrations are between about 0.01 and 5 percent by weight based upon the reactants, more preferably between about 0.01 to 1.0 percent by weight, and most preferably 0.05 to 0.1 percent by weight.

It is preferred to remove the catalysts used to prepare the starting poly(alkylene carbonate) polyahls prior to advancing these polyahls to higher molecular weights, as such catalysts can result in the decomposition of the poly(alkylene carbonate) polyahls at the temperatures used under molecular weight advancement conditions. While trace amounts of such catalysts can be present without significant decomposition, the bulk of the catalyst used to prepare the starting poly(alkylene carbonate) polyahls is removed prior to the advancement process of this invention. The combination of short reaction times in the presence of very low catalyst levels allows high molecular weight build with minimal decomposition. Catalyst can be removed conveniently by the method U.S. Pat. No. 4,528,364.

The polyisocyanates suitable for making the novel compositions of this invention include aliphatic, cycloaliphatic, araliphatic, aromatic and heterocyclic polyisocyanates. Specific examples include ethylene diisocyanate, 1,4-tetramethylene diisocyanate, 1,6-hexamethylene diisocyanate, 1,12-dodecane diisocyanate, cyclobutane-1,3-diisocyanate, cyclohexane-1,3- and 1,4-diisocyanate and mixtures of these isomers; 1-isocyanato-3,3,5-trimethyl-5-isocyanato methyl cyclohexane (see e.g., German Auslegeschrift No. 1,202,785); 2,4- and 2,6-hexahydrotolylene diisocyanate and mixtures of these isomers, hexahydro-1,3- and/or 1,4-phenylene diisocyanate, perhydro-2,5'- and/or 4,4'-diphenyl methane diisocyanate, 1,3- and 1,4-phenylene diisocyanate, 2,4- and 2,6-tolylene diisocyanate and mixtures of these isomers, diphenyl methane-2,4'- and/or 4,4'-diisocyanate, naphthylene-1,5-diisocyanate, triphenyl methane-4,4',4"-triisocyanate, polyphenyl polymethylene polyisocyanates of the type obtained by condensing aniline with formaldehyde, followed by phosgenation and such as described for example in British Patents 874,430 and 848,671, perchlorinated aryl polyisocyanates of the type described in German Auslegeschrift 1,157,601, polyisocyanates containing carbodiimide groups of the type described in German patent 1,092,007, diisocyanates of the type described in U.S. Pat. No. 3,492,330, polyisocyanates containing allophanate groups of the type described, for example, in British patent 994,890, in Belgian patent 761,626 and in published Dutch patent application No. 7,102,524, polyisocyanates containing isocyanurate groups of the type described in German patents 1,022,789; 1,222,067 and 1,027,394 and in German Offenlegungsschrift 1,929,034 and 2,004,048, polyisocyanates containing urethane groups of the type described, for example, in Belgian patent 752,261 or in U.S. Pat. No. 3,394,164, polyisocyanates containing acrylated urea groups as described in German patent 1,230,778, polyisocyanates containing biuret groups of the type described, for example, in German patent 1,101,392, in British patent 889,050 and in French patent 7,017,514, polyisocyanates obtained by telomerization reactions of the type described, for example, in Belgian patent 723,640, polyisocyanates containing ester groups of the type described, for example, in British patents 965,474 and 1,072,956, in U.S. Pat. No. 3,567,763 and in German patent 1,231,688 and reaction products of the aforementioned isocyanates with acetals as described in German patent 1,072,385.

It is also possible to use the distillation residues containing isocyanate groups accumulating in the commercial production of isocyanates, optionally in solution in one or more of the aforementioned polyisocyanates. In addition, it is possible to use mixtures of the aforementioned polyisocyanates.

Additional polyisocyanates suitable for use in this invention include those described by W. Siefken in Justus Liebigs Annalen der Chemie, 562, pp. 75–136, and in U.S. Pat. Nos. 3,284,479; 4,089,835; 4,093,569; 4,221,876; 4,310,448; 4,359,550 and 4,495,309.

One class of particularly useful polyisocyanates are the aromatic polyisocyanates such as 2,4- and 2,6-tolylene diisocyanates and mixtures of these isomers ("TDI"), polyphenyl-polymethylene polyisocyanates of the type obtained by condensing aniline with formaldehyde, followed by phosgenation ("crude MDI") and, polyisocyanates containing carbodiimide groups, urethane groups, allophanate groups, isocyanurate groups, urea groups or biuret groups ("modified polyisocyanates").

A preferred class of aromatic polyisocyanates is methylene bis(4-phenylisocyanate) or MDI. Pure MDI, quasi- and prepolymers of MDI, modified pure MDI, etc. Materials of this type may be used to prepare suitable RIM elastomers. Since pure MDI is a solid and, thus, often inconvenient to use, liquid products based on MDI are often used and are included in the scope of the terms MDI or methylene bis(4-phenylisocyanate) used herein. U.S. Pat. No. 3,394,164 is an example of a liquid MDI product. More generally uretonimine modified pure MDI is included also. This product is made by heating pure distilled MDI in the presence of a catalyst.

A preferred class of isocyanate-modified poly(alkylene carbonate) polyahl compositions of this invention are random polymers which correspond to the formula

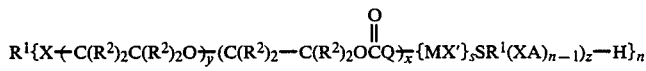

II wherein
R¹, R², X, A, Q, n, x, y and z are as previously defined;
M is separately in each occurrence the residue of an aliphatic, cycloaliphatic, araliphatic, aromatic or heterocyclic polyisocyanate or a combination thereof;
X' is separately in each occurrence O, S or NH; and
s is separately in each occurrence an integer of from 1 to 5.

A more preferred class are random isocyanate-modified poly(alkylene carbonate) polyols generally corresponding to formula II wherein R¹, R² and n are as previously defined
wherein
X' is oxygen;
x is separately in each occurrence an integer from 2 to 10;
y is separately in each occurrence an integer from 5 to 15; and
z is an integer from 0 to 2, provided that the ratio of y to x is from 1:1 to 3:1.

Preferred among the above are isocyanate-modified poly(alkylene carbonate) polyols of the invention
wherein
R¹ is hydrogen, $C_{1-20}$ alkyl, $C_{1-20}$ haloalkyl, $C_{1-20}$ alkenyl or phenyl;
X is S, O or NH;
M is the residue of a polyisocyanate selected from the group consisting of toluene diisocyanate, methylene bis(4-phenylisocyanate), quasi- and prepolymers of methylene bis(4-phenylisocyanate) and combinations thereof; and
n is an integer from 1 to 10.

Further preferred random isocyanate-modified poly(alkylene carbonate) polyols of the invention are those
wherein
R¹ is an n-valent alkane or cycloalkane, or an n-valent alkane or cycloalkane containing one or more oxygen, nitrogen, or sulfur moieties;
R² is hydrogen, methyl or ethyl;
X is O;
n is an integer from 1 to 5; and
s is an integer from 1 to 3.

Still more preferred are the isocyanate-modified poly(alkylene carbonate) polyols
wherein
R¹ is n-valent $C_{1-20}$ alkane or an n-valent $C_{1-10}$ alkane substituted with one or more oxygen moieties;
R² is hydrogen or methyl; and
n is 1 or 2.

The most preferred of the isocyanate-modified poly(alkylene carbonate) polyols is wherein R² is hydrogen.

Another preferred group of isocyanate-modified poly(alkylene carbonate) polyols of the invention are those random polymers which correspond to the formula

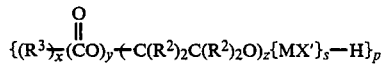

III wherein
R² is as previously defined;
R³ is $R^4$-$X^1_n$;

R⁴ is separately in each occurrence an n-valent hydrogen radical or hydrocarbon radical which contains one or more heteroatoms of O, N or S;
X¹ is separately in each occurrence O, S or NH;
M is separately in each occurrence the residue of an aliphatic, cycloaliphatic, araliphatic, aromatic or heterocyclic polyisocyanate or a combination thereof;
n is separately in each occurrence an integer of from 1 to 25;
p is an integer of 1 or greater;
s is an integer of from 1 to 5;
x is 1;
y is separately in each occurrence 1 to 40; and
z is separately in each occurrence 1 to 100.

A still more preferred group of random isocyanate-modified poly(alkylene carbonate) polyols is that corresponding to formula III and
wherein
R² is hydrogen, $C_{1-20}$ alkyl, $C_{1-20}$ haloalkyl, $C_{1-20}$ alkenyl or phenyl;
R⁴ is an aliphatic or cycloaliphatic hydrocarbon or an aliphatic or cycloaliphatic hydrocarbon containing one or more oxygen, sulfur or nitrogen moieties;
M is separately in each occurrence the residue of a polyisocyanate selected from the group consisting of toluene diisocyanate, methylene bis(4-phenylisocyanate), quasi- and prepolymers of methylene bis(4-phenylisocyanate) and combinations thereof;
X' is separately in each occurrence S, O or NH;
n is an integer of 1 to 10, inclusive;
p is 1 to 10, inclusive;
y is 5 to 20, inclusive; and
z is 20 to 50, inclusive.

An even more preferred group of random isocyanate-modified poly(alkylene carbonate) polyols corresponding to formula III is that
wherein
R² is hydrogen, $C_{1-3}$ alkyl, $C_{2-3}$ alkenyl or phenyl;
R⁴ is an n-valent alkane or cycloalkane or an n-alkane alkane or cycloalkane containing one or more oxygen, sulfur or nitrogen moieties;
n is an integer of 1 to 5, inclusive;
p is an integer of 1 to 5, inclusive;
s is an integer of from 1 to 3, inclusive; and
X' is O.

A yet more preferred group of random isocyanate-modified poly(alkylene carbonate) polyols is that corresponding to formula III and wherein
R² is hydrogen, methyl or ethyl;
R⁴ is an n-valent $C_{1-10}$ alkane; and
n is 1 or 2.

The novel, isocyanate-modified poly(alkylene carbonate) polyahl compositions of this invention contain several key components in their backbones. The residue of at least one polyahl initiator is present, typically, as the result of the particular initiator employed to make the starting material, the poly(alkylene carbonate) polyahl. The amount of initiator residue present is that amount necessary to make the desired molecular weight starting material.

The products also include a plurality of poly(alkylene carbonate) moieties. These moieties are present in the starting material, the poly(alkylene carbonate) polyahl as a consequence of the carbon dioxide used in their preparation. The carbonate moieties are present in amounts sufficient (1) to act as reaction sites when the isocyanate-modified poly(alkylene carbonate) polyahls are advanced to higher molecular weights by heating under reduced pressure and (2) to provide the required amount of polyester character to the resultant polymer backbone to give useful properties such as toughness, abrasion resistance and solvent resistance.

Poly(alkyleneoxy) moieties are also present in the product as a consequence of their presence in the starting material, the poly(alkylene carbonate) polyahl. Some of these moieties are present in amounts sufficient (1) to act as the source of diethylene glycol, triethylene glycol, etc. which are removed as volatile components when the isocyanate-modified poly(alkylene carbonate) polyahls are advanced to higher molecular weights by heating under reduced pressure and (2) to provide the required amount of polyether character to the resultant polymer backbone to give useful properties such as flexibility and elongation to break. The type of alkyleneoxy moieites are also important. For example, ethyleneoxy units are important for properties such as improved antistatic characteristics while propyleneoxy or butyleneoxy moieties are important for properties such as improved hydrolytic stability.

The residues of at least one polyisocyanate are present as a consequence of the reactions of polyisocyanates with the poly(alkylene carbonate) polyahl starting materials. These polyisocyanate residues are present in amounts sufficient to improve properties such as modulus, strength, hardness, elongation to break and/or solvent resistance in the resultant urethane/urea polymers.

The amount of polyisocyanate used to make the isocyanate-modified poly(alkylene carbonate) polyahls of this invention range from about 1 to 25 weight percent based on the weight of the product. The type of polyisocyanate can be an aliphatic, cycloaliphatic, araliphatic, aromatic or heterocyclic polyisocyanate or a combination thereof. The choice of polyisocyanate depends on the application. An aliphatic polyisocyanate is used where weatherability in the environment is important. An aromatic polyisocyanate is used, for example, in higher temperature applications.

The carbon dioxide content of the isocyanate-modified poly(alkylene carbonate) polyahl compositions can vary over a wide range to provide the desired property improvement over a polyether. A preferred range of carbon dioxide contents is from about 5 to about 30 weight percent carbon dioxide based on the weight of the isocyanate-modified poly(alkylene carbonate) polyahl product; a more preferred range is from about 7 to about 25 weight percent carbon dioxide and a most preferred range is from about 10 to about 22 weight percent carbon dioxide.

The molecular weight of the isocyanate-modified poly(alkylene carbonate) polyahl product can vary over a wide range. Preferred molecular weights ($\overline{Mn}$) are between about 400 and about 20,000; a more preferred range is from 800 to 10,000 and the most preferred range is from 1,000 to 8,000.

In general, the viscosity of an isocyanate-modified poly(alkylene carbonate) polyahl is higher than the viscosity of the corresponding unmodified poly(alkylene carbonate) polyahl. This makes the isocyanate-modified poly(alkylene carbonate) polyahls more difficult to handle at higher isocyanate modifications.

The isocyanate-modified poly(alkylene carbonate) polyahls of this invention are made by reacting a poly(alkylene carbonate) polyahl with a less than stoichiometric amount of a polyisocyanate under conditions sufficient for reaction to occur. When the poly(alkylene carbonate) polyahl starting material has amino end groups, the isocyanate-modified poly(alkylene carbonate) polyahl product contains urea moieties in its backbone; reaction occurs at about ambient temperature and depends on the polyisocyanate employed. Somewhat higher temperatures may be required for aliphatic polyisocyanates. When the poly(alkylene carbonate) polyahl starting material has hydroxyl end groups, the isocyanate-modified poly(alkylene carbonate) polyahl product contains urethane moieties in its backbone; reaction occurs at temperatures from about 40° C. to 100° C. Higher temperatures may be required for aliphatic polyisocyanates. Lower temperatures are useful when employing typical isocyanate catalysts. The molecular weight is increased by these reactions.

In a preferred embodiment, the molecular weight of the isocyanate-modified poly(alkylene carbonate) polyahl of this invention is further increased by using the processes of copending U.S. patent applications Ser. No. 750,362, filed July 1, 1985 and Ser. No. 850,788, filed Apr. 11, 1986. These processes involve exposing the isocyanate-modified poly(alkylene carbonate) polyahl to elevated temperatures under reduced pressure conditions to split off a dialkylene glycol moiety, a triethylene glycol moiety and/or a moiety which is as volatile or more volatile than the dialkylene glycol or trialkylene glycol moiety and removing such volatile components from the reaction mass. Generally, the dialkylene glycol and/or initiator will volatilize. Depending on the degree of rectification used, and the $CO_2$ content, less volatile components may come off, such as the trialkylene glycols. If the isocyanate-modified poly(alkylene carbonate) polyahl starting material contains no dialkylene glycol units, the trialkylene glycol units can be removed by this process. In general, the lightest fraction which splits from the starting material will be taken off. In those embodiments wherein the poly(alkylene carbonate) polyahl is a monofunctional species, that is, where the initiator has only one active hydrogen site, under certain circumstances the initiator fragment may be more volatile than the dialkylene glycol fragment and therefore will split off and be removed more readily than the dialkylene glycol portion. When the initiator is a linear $C_{1-8}$ alcohol, the $C_{1-8}$ alcohol fragment will be removed before any dialkylene glycol fragments will be removed. Where a linear $C_{10}$ or $C_{11}$ alcohol is used as the initiator, the linear $C_{10}$ or $C_{11}$ alcohol is about as volatile as the dialkylene glycol and therefore should come off at the same time. Wherein a linear $C_{12}$ or greater alcohol is the initiator, the dialkylene glycol is more volatile and will split off. Branched alcohol initiators have somewhat different volatilities and will be split out based on its relative volatility as compared to the dialkylene or trialkylene glycol fragment.

A dialkylene glycol refers herein to two alkylene moieties connected by an oxygen and terminated by a hydroxyl group, wherein the alkylene moieties can be substituted with a hydrocarbyl moiety. Preferred dialkylene glycol moieties correspond to the formula

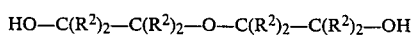

$$HO-C(R^2)_2-C(R^2)_2-O-C(R^2)_2-C(R^2)_2-OH$$

wherein R² is as hereinbefore defined. Examples of preferred dialkylene glycols include dipropylene glycol, diethylene glycol, 1,2-dibutylene glycol, 2,3-dibutylene glycol, and the like.

The volatile component can be removed by any method known in the art. Such methods include fractional distillation, fractionation, passing an inert gas over the reaction mass so as to remove the volatile species, and any other method for removing the volatile species condensed by a water-chilled condenser as is known in the art, for example, a falling film still such as a wiped film evaporator is particularly useful. A preferred method of condensing the distillate is by the use of a water-chilled condenser. The majority of the volatile components present such as acetone and water, both introduced during catalysts removal, and dioxane, small quantities of which can be present due to decomposition, pass through the water-chilled condenser under the reduced pressure conditions employed and can be condensed using a dry ice condenser. The volatile species condensed by the water-chilled condenser can be recycled to be used as initiators for the preparation of poly(alkylene carbonate) polyahls useful as starting materials in this process.

The process takes place at any temperature at which the splitting off of the volatile segments occurs. The lower temperature limit is that temperature at which the splitting of the volatile component occurs, and the upper limit is that temperature at which the isocyanate-modified poly(alkylene carbonate) polyahl undergoes decomposition. Preferred temperatures are between about 150° C. and 300° C. More preferred temperatures are between about 175° C. and 260° C., with between about 200° C. and 250° C. being most preferred.

Pressures used in this process are those pressures at which the dialkylene glycol or species as volatile or more volatile than dialkylene glycol will volatilize at the temperatures used. Preferable pressures are atmospheric and subatmospheric, with subatmospheric pressures being more preferable. More preferable pressures are less than about 300 mm Hg, even more preferably less than about 100 mm Hg, even more preferably less than about 50 mm Hg, and most preferably between 10 and 30 mm Hg.

The reaction time for the process is variable depending on various factors, including temperatures, pressure, and the molecular weight of the desired product. At lower pressures, and higher temperatures, the time to achieve the desired molecular weight is lower. The process can be run for a time sufficient to give the desired molecular weight. Reaction times are relatively rapid, only a few hours are required in most cases.

The process is generally performed by exposing the isocyanate-modified poly(alkylene carbonate) polyahl in neat form to the processing conditions. The process can be performed in a solvent, although performing the process in neat form is preferred. Solvents useful include inert organic solvents with a boiling point above that of the dialkylene glycol, or the most volatile species.

In a second aspect, this invention is an isocyanate-functional prepolymer composition of the novel isocyanate-modified poly(alkylene carbonate) polyahl composition of this invention formed by the reactions of an isocyanate-modified poly(alkylene carbonate) polyahl with excess polyisocyanate.

The polyisocyanates suitable for these reactions have been defined hereinbefore.

The isocyanate-functional prepolymers of this invention can be made by addition of excess polyisocyanates to the isocyanate-modified poly(alkylene carbonate) polyahls of this invention or by addition of the isocyanate-modified poly(alkylene carbonate) polyahls of this invention to excess polyisocyanates. The preparation of isocyanate-functional prepolymers with prior art polyahls is well-known in the art. Examples can be found in U.S. Pat. Nos. 4,108,842; 4,125,522 and 4,476,292, the relevant portions of which are hereby incorporated by reference.

In a third aspect, this invention is a novel urethane/urea polymer formed by the reactions of an isocyanate-functional prepolymer composition based on the novel, isocyanate-modified poly(alkylene carbonate) polyahls of this invention with polyahls; many of these polyahls are commonly called chain-extenders when used with isocyanate-functional prepolymers. Optionally, catalysts and a variety of additives can be included.

The chain-extenders useful to make the compositions of this invention are preferably difunctional. Mixtures of difunctional and trifunctional chain-extenders are also useful in this invention. The chain-extenders useful in this invention include diols, amino alcohols, diamines or mixtures thereof. Low molecular weight linear diols such as 1,4-butanediol and ethylene glycol have been found suitable for use in this invention. Other chain-extenders including cyclic diols such as 1,4-cyclohexanediol and 1,4-cyclohexanedimethanol; aromatic ring-containing diols such as bishydroxyethylhydroquinone; amide or ester-containing diols or amino alcohols are useful. Aromatic diamines and aliphatic diamines are suitable chain-extenders. Examples include ethylenediamines, 1-(2-aminoisopropyl-4-methyl-4-aminocyclohexane), 1,2-propanediamine, 1,4-butanediamine; 1,6-hexanediamine, diethyltoluenediamine and 1,4-bis-(aminomethyl)cyclohexane. Additional examples of useful chain-extenders can be found in U.S. Pat. Nos. 4,297,444; 4,202,957; 4,476,292; 4,495,309 and 4,218,543.

Catalysts such as tertiary amines or an organic tin compound or other polyurethane catalysts may be used. The organic tin compound may suitably be a stannous or stannic compound, such as stannous salt of a carboxylic acid, a trialkyltin oxide, a dialkyltin dihalide, a dialkyltin oxide, etc., wherein the organic groups of the organic portion of the tin compound are hydrocarbon groups containing from 1 to 18 carbon atoms. For example, dibutyltin dilaurate, dibutyltin diacetate, diethyltin diacetate, dihexyltin diacetate, di-2-ethylhexyltin oxide, dioctyltin dioxide, stannous octoate, stannous oleate, etc., or a mixture thereof, may be used. Other catalysts include organo zinc, mercury and lead compounds.

Tertiary amine catalysts include trialkylamines (e.g., trimethylamine, triethylamine), heterocyclic amines, such as N-alkylmorpholines (e.g., N-methylmorpholine, N-ethylmorpholine, dimethyldiaminodiethyl ether, etc.), 1,4-dimethylpiperazine, triethylenediamine, etc., and aliphatic polyamines, such as N,N,N',N'-tetramethyl-1,3-butanediamine.

Optional additives include anti-foaming agents such as glycerine, an ethyl acrylate-2-ethylhexyl acrylate copolymer, dimethyl siloxane copolymers and silicones; antioxidants such as esters of β-(3,5-di-tert-butyl-4-hydroxyphenyl) propionic acid with monohydric or polyhydric alcohols, for example, methanol, octadecanol, 1,6-hexanediol, neopentyl glycol, thiodiethylene glycol, diethylene glycol, triethylene glycol, pentaerythritol, tris-hydroxyethyl isocyanurate, and dihydroxyethyl oxalic acid diamide; UV absorbers and light stabilizers such as 2-(2'-hydroxyphenyl)benzotriazoles and sterically hindered amines such as bis-(2,2,6,6-tetramethylpiperidyl)-sebacate, bis-(1,2,2,6,6-pentamethylpiperidyl)-sebacate, n-butyl-3,5-di-tert-butyl-4-hydroxybenzyl malonic acid, bis-(2,2,6,6-pentamethylpiperidyl)ester, condensation product of 1-hydroxyethyl-2,2,6,6-tetramethyl-4-hydroxypiperidine and succinic acid, condensation product of N,N'-(2,2,6,6-tetramethylpiperidyl)-hexamethylene diamine and 4-tert-octylamino-2,6-dichloro-1,3,5-s-triazine, tris(2,2,6,6-tetramethylpiperidyl)-nitrilotriacetate, tetrakis-(2,2,6,6-tetramethyl-4-piperidyl)-1,2,3,4-butane-tetracarbonic acid and 1,1'-(1,2-ethanediyl)-bis-(3,3,5,5-tetramethyl-piperazinone); plasticizers such as phthalates, adipates, glutarates, epoxidized vegetable oils, and the like; fungicides; pigments; dyes; reactive dyes; moisture scavengers; and the like. In addition, fillers and reinforcing materials such as chopped or milled glass fibers, chopped or milled carbon fibers and/or other mineral fibers are useful.

Approximately stoichiometric amounts of the isocyanate moieties of the isocyanate-functional prepolymers of this invention and the active hydrogen moieties on the polyahls are used. The equivalent ratio of isocyanate moieties to total active hydrogen moieties is between about 0.95:1.00 to 1.00:1.05; more preferred is an isocyanate:polyahl equivalent ratio of from 0.97:1.00 to 1.00:1.03; most preferred is a ratio of 1.00:1.00 to 1.00:1.03.

In a fourth aspect, this invention is a novel, urethane-urea polymer formed by the reactions of the isocyanate-modified poly(alkylene carbonate) polyahls of this invention with polyisocyanates, optionally in the presence of other polyahls. Optionally, catalysts and a variety of additives can be included. Useful polyisocyanates, catalysts and additives are those that have been defined hereinbefore.

Approximately stoichiometric amounts of the isocyanate moieties on the polyisocyanates and the total active hydrogen moieties on the isocyanate-modified poly(alkylene carbonate) polyahls and other polyahls, if employed, are used. The equivalent ratio of isocyanate moieties to total active hydrogen moities is between about 0.95:1.00 to 1.00:1.05; more preferred is an isocyanate:active hydrogen equivalent ratio of from 0.97:1.00 to 1.00:1.03; most preferred is a ratio of 1.00:1.00 to 1.00:1.03. The preparation of urethane/urea polymers is well-known in the art. Examples of typical reaction conditions employed can be found in U.S. Pat. Nos. 4,460,715 and 4,394,491, the relevant portions of which are hereby incorporated by reference.

The urethane/urea polymers of the present invention can be fabricated by any fabrication technique known in the art. Useful processes include hand casting (see, for example, U.S. Pat. No. 4,476,292) and reaction injection molding (see, for example, U.S. Pat. Nos. 4,297,444 and 4,495,309).

SPECIFIC EMBODIMENTS

The following examples are included for illustrative purposes only, and do not limit the scope of the invention or the claims. Unless otherwise stated, all parts and percentages are by weight.

The molecular weights and distribution are determined by size exclusion chromatography on Waters Ultrastyragel ® 1000 Å and 10.000 Å columns in series using tetrahydrofuran (THF) as the mobile phase and calibrated with narrow molecular weight poly(ethylene glycol) standards.

The Brookfield viscosities are all measured at ambient temperature using an LV4 spindle at the appropriate spin rate.

Distillate samples are analyzed by capillary gas chromatography on a Hewlett-Packard 5840A unit equipped with a J&W Scientific Company DB-1 fused silica capillary column using flame ionization detection.

EXAMPLE 1

A low molecular weight ($\overline{M}n$ of 700) poly(ethylene carbonate) polyol (960.0 g; prepared from diethylene glycol, ethylene oxide and carbon dioxide) is placed in a 1-liter, 3-necked reaction flask equipped with thermometer, overhead stirrer, dropping funnel, temperature controller and maintained under a nitrogen atmosphere. Methylene bis(phenyl isocyanate) (108.10 g; MDI; freshly distilled) is placed in the dropping funnel. The MDI is added dropwise with stirring over a 30-minute period at ambient temperature. The contents of the reactor are then heated at 80° C. for 4 hours. The product (1066.5 g) is a straw-colored, viscous liquid with a Brookfield viscosity of 31,100 cps at 24° C. and has the following molecular weight properties: Peak=2419; $\overline{M}n$=1473; $\overline{M}w$=2736; PDI=1.86. Carbon-13 nuclear magnetic resonance is consistent with the expected MDI-modified poly(ethylene carbonate) polyol structure. The polyol backbone contains both carbonate (155.2 ppm) moieties and aromatic urethane (153.8 ppm) moieties.

This example shows that the backbone of a poly(ethylene carbonate) polyol can be modified with 10.1 weight percent MDI to produce a hydroxy-functional polyol containing aromatic urethane moieties in its backbone.

EXAMPLE 2

A portion of the product from Example 1 (81.3 g) and boiling stones (0.2 g) are combined in a 100-ml, 2-necked boiling flask equipped with a thermometer, temperature controller and a simple distillation head (no column) containing a water condenser and attached to a vacuum source through a dry ice-isopropanol trap. The contents of the flask are heated at 10 mm Hg vacuum and samples are removed for molecular weight determination at various pot temperatures shown in Table I.

TABLE I

| Sample Number | Pot Temperature (° C.) | Molecular Weight | | | |
|---|---|---|---|---|---|
| | | Peak | Mn | Mw | PDI |
| 1 | starting material | 2419 | 1473 | 2736 | 1.86 |
| 2 | 200 | 2469 | 1510 | 2875 | 1.90 |
| 3 | 220 | 2905 | 1698 | 3477 | 2.05 |
| 4 | 230 | 3851 | 2014 | 4375 | 2.17 |
| 5 | 240 | 4340 | 2251 | 5295 | 2.35 |
| 6 | 252 | 6781 | 2876 | 7759 | 2.69 |

When the pot temperature reaches 252° C., the system is cooled under nitrogen. The distillate collected in the water condenser accounts for 9.6 weight percent (7.8 g) of the sample charged and has the following assay: 0.65 percent dioxane, 2.39 percent ethylene carbonate, 66.4 percent diethylene glycol, 16.7 percent triethylene glycol and 1.15 percent tetraethylene glycol. The distillate collected in the dry ice-isopropanol trap accounts for 0.6 weight percent (0.5 g) of the sample charged. The residue is a yellow, viscous liquid accounting for 86.5 weight percent (70.3 g) of the sample charged and has a Brookfield viscosity of 426,000 cps at 24° C.

This example shows that a series of urethane-modified poly(ethylene carbonate) polyols of various molecular weights can be made by this invention.

EXAMPLE 3

A portion of the product from Example 1 (900.8 g) and boiling stones (0.2 g) are combined in a 1-liter, 3-necked boiling flask equipped with a thermometer, temperature controller and a down draft water-chilled condenser attached to a vacuum source through a dry ice-isopropanol trap (about −78° C.). The contents of the reactor are heated to a pot temperature of 230° C. over a period of 2 hours at 10 mm Hg vacuum. The distillate collected in the water-chilled condenser accounts for 4.5 weight percent (40.5 g) of the sample charged and has the following assay: 0.90 percent dioxane, 9.55 percent ethylene carbonate, 53.9 percent diethylene glycol, 25.2 percent triethylene glycol and 3.90 percent tetraethylene glycol. The distillate collected at −78° C. accounts for 0.2 weight percent (1.9 g) of the sample charged and has the following assay: 45.0 percent dioxane, 36.5 percent acetone and 6.6 percent water. The residue is a light amber, viscous liquid containing 10.7 weight percent MDI chemically incorporated into the polyol backbone, represents 94.8 weight percent (853.5 g) of the sample charged and has a Brookfield viscosity of 106,400 cps at 24° C. The $\overline{Mn}$ by end group (OH) titration is 1560. The molecular weight by size exclusion chromatography is: Peak=3484; $\overline{Mn}$=1912; $\overline{Mw}$=3954; PDI=2.07. Tg=−33° C.

This example shows a scale-up of a urethane-modified poly(ethylene carbonate) polyol.

EXAMPLE 4

The low molecular weight poly(ethylene carbonate) polyol used in Example 1 (1001.7 g) is placed in the same reaction setup as used in Example 1. MDI (60.1 g, freshly distilled, 125M) is placed in the dropping funnel and added dropwise with stirring over a 15-minute period at ambient temperature. The contents of the reactor are then heated to 80° C. for 3 hours. The product (1061.5 g) is a straw-colored, viscous liquid with a Brookfield viscosity of 9210 cps at 25° C. and has the following molecular weight properties: Peak=1677; $\overline{Mw}$=1937; PDI=1.74.

A portion of the product formed above (913.1 g) and boiling stones (0.2 g) are combined in the same equipment used in Example 3. The contents of the reactor are heated to a pot temperature of 230° C. over a period of 2 hours at 10 mm Hg vacuum. The distillate collected in the water-chilled condenser accounts for 9.1 weight percent (82.7 g) of the sample charged and has the following assay: 0.69 percent dioxane, 6.11 percent ethylene carbonate, 50.4 percent diethylene glycol, 29.4 percent triethylene glycol and 5.60 percent tetraethylene glycol. The distillate collected at −78° C. accounts for 0.3 weights percent (2.6 g) of the sample charged and has the following assay: 45.7 percent dioxane, 36.4 percent acetone and 6.1 percent water. The residue is a light amber, viscous liquid containing 6.28 weight percent MDI chemically incorporated into the polyol backbone, represents 90.2 weight percent (823.4 g) of the sample charged and has a Brookfield viscosity of 63,300 cps at 24° C. The $\overline{Mn}$ by end group (OH) titration is 1752. The molecular weight by size exclusion chromatography is: Peak=4089; $\overline{Mn}$=2103; $\overline{Mw}$=4463; PDI=2.12. Carbon-13 nuclear magnetic resonance indicates that the polyol backbone contains both carbonate (155.2 ppm) moieties and aromatic urethane (153.8 ppm) moieties. Tg=−36° C.

EXAMPLE 5

The low molecular weight poly(ethylene carbonate) polyol used in Example 1 (1001.9 g) is placed in the same reaction setup as used in Example 1. TDI (61.0 g, 80 percent toluene-2,4-diisocyanate and 20 percent toluene-2,6-diisocyanate) is placed in the dropping funnel and added dropwise with stirring over a 15-minute period at ambient temperature. The contents of the reactor are then heated to 80° C. for 3 hours. The product (1062.9 g) is a straw-colored viscous liquid with a Brookfield viscosity of 13,600 cps at 24° C. and has the following molecular weight properties: Peak=2014; $\overline{Mn}$=1189; $\overline{Mw}$=2123; PDI=1.79.

A portion of the product formed above (912.6 g) and boiling stones (0.2 g) are combined in the same equipment used in Example 3. The contents of the reactor are heated to a pot temperature of 230° C. over a period of 2 hours at 10 mm Hg vacuum. The distillate collected in the water-chilled condenser accounts for 8.0 weight percent (73.1 g) of the sample charged and has the following assay: 7.00 percent ethylene carbonate, 54.9 percent diethylene glycol, 26.8 percent triethylene glycol and 4.30 percent tetraethylene glycol. The distillate collected at −78° C. accounts for 0.2 weight percent (2.0 g) of the sample charged and has the following assay: 31.7 percent dioxane, 44.4 percent acetone and 10.1 percent water. The residue is a light amber, viscous liquid containing 6.29 weight percent TDI chemically incorporated into the polyol backbone, represents 91.3 weight percent (832.8 g) of the sample charged and has a Brookfield viscosity of 101,800 cps at 24° C. The $\overline{Mn}$ by end group (OH) titration is 1820. The molecular weight by size exclusion chromatography is: Peak=3700; e,ovs/M/ n=2024; $\overline{Mw}$=4370; PDI=2.16. Carbon-13 nuclear magnetic resonance indicates that the polyol backbone contains both carbonate (155.2 ppm) moieties and aromatic urethane (153.8 ppm) moieties. Tg=−30° C.

EXAMPLE 6

The low molecular weight poly(ethylene carbonate) polyol used in Example 1 (799.0 g) is placed in the same reaction setup as used in Example 1 and heated to 80° C. MDI (171.0 g, freshly distilled, 125M) is placed in the dropping funnel and added dropwise with stirring over a 30-minute period. The contents of the reactor are held at 80° C. for 2 hours after the addition is complete. The product is a straw-colored, viscous liquid with a Brookfield viscosity of 898,000 cps at 25° C., contains 18.0 weight percent MDI chemically incorporated into the polyol backbone, Tg=−22° C., and has the following molecular weight properties: Peak=5208; $\overline{Mn}$=2602; $\overline{Mw}$=5373 and PDI=2.06.

EXAMPLE 7

Preparation of an Isocyanate-Functional Prepolymer

A portion of the 10.7 weight percent MDI-modified poly(ethylene carbonate) polyol prepared in Example 3 (69.63 g) and one drop (about 15 mg) of benzoyl chloride are placed in a 100-ml resin pot reactor equipped with thermometer, overhead stirrer, temperature controlled at 80° C. with a water bath and maintained under a nitrogen atmosphere. Freshly distilled 4,4'-methylene bis(phenyl isocyanate) (MDI; 45.1 g) is added to the reactor. The reactor is maintained at 80° C. for one hour after the MDI addition; the resultant isocyanate-functional prepolymer is then analyzed for isocyanate content (ASTM D-2638-74) and found to be 9.77 weight percent NCO.

EXAMPLE 8

Preparation of a Polyurethane Elastomer

The isocyanate-functional prepolymer of Example 7 is thoroughly degassed under vacuum and quickly poured into a 150-ml plastic cup (102.44 g). One drop (about 15 mg) of a catalyst solution is added (10.0 weight percent dibutyltin dilaurate in a 1200 molecular weight poly(propylene glycol). 1,4-Butanediol (10.20 g, distilled from calcium hydride) is thoroughly degassed under vacuum and added quickly to give a 105 index (molar ratio of isocyanate:polyol is 1.05:1). The mixture is stirred rapidly for 48 seconds and then poured into a preheated mold (6.0"×6.0"×0.125"). The sample is cured at 121° C. (250° F.) for one hour. An elastomeric urethane plaque is obtained upon demolding. The part is allowed to stand for 14 days at ambient conditions; then physical properties are determined (see Table II).

EXAMPLE 9

Preparation of an Isocyanate-Functional Prepolymer

A prepolymer is made from the 6.28 weight percent MDI-modified poly(ethylene carbonate) polyol prepared in Example 4 (70.67 g), freshly distilled MDI (45.1 g) and one drop of benzoyl chloride (about 15 mg) using the same equipment and procedure as in Example 7. The prepolymer has a 10.00 weight percent NCO content.

EXAMPLE 10

Preparation of a Polyurethane Elastomer

The isocyanate-functional prepolymer of Example 9 (104.23 g), one drop of catalyst solution and 1,4-butanediol (10.62 g, 105 index) are used to form a plaque using the same procedure and conditions as in Example 8. The physical properties are given in Table II.

EXAMPLE 11

Preparation of an Isocyanate-Functional Prepolymer

A prepolymer is made from the 6.29 weight percent TDI-modified poly(ethylene carbonate) polyol prepared in Example 5 (71.02 g), freshly distilled MDI (44.0 g) and one drop of benzoyl chloride (about 15 mg) using the same equipment and procedure as in Example 7. The prepolymer has a 9.90 weight percent NCO content.

EXAMPLE 12

Preparation of a Polyurethane Elastomer

The isocyanate-functional prepolymer of Example 11 (104.02 g), one drop of catalyst solution and 1,4-butanediol (10.50 g, 105 index) are used to form a plaque using the same procedure and conditions as in Example 8. The physical properties are given in Table II.

TABLE II

| Polymer From Example | Wt % Modifier in Polyol | Wt % NCO in Prepolymer | Density [1] (g/cc) | Hardness [2] (Shore D) | Flexural [3] Modulus | Notched Izod [4] | Tensile Stress at % Elongation [5] | | | | % Elongation at Break [6] | Solvent Resistance [7] (% Wt Gain; 6 days @ Ambient Temperature) | | | |
|---|---|---|---|---|---|---|---|---|---|---|---|---|---|---|---|
| | | | | | | | 100% | 200% | 300% | At Break | | Water | Toluene | Methanol | MEK |
| — | 0 | 10.00 | 1.27 | 48 | 10,600 | No break | 1440 | 1720 | 1970 | 2260 | 460 | 4.6 | 11.7 | 11.7 | 30.9 |
| 8 | 10.7% MDI | 9.77 | 1.27 | 60 | 13,900 | No break | 2230 | 2610 | 2950 | 3470 | 530 | 2.8 | 3.7 | 11.5 | 29.4 |
| 10 | 6.28% MDI | 10.00 | 1.27 | 51 | 10,200 | No break | 1730 | 2160 | 2520 | 4120 | 770 | 3.5 | 5.6 | 11.7 | 28.5 |
| 12 | 6.29% TDI | 9.90 | 1.27 | 58 | 10,400 | No break | 1780 | 2190 | 2540 | 3860 | 700 | 3.8 | 5.2 | 12.5 | 28.6 |

[1] Determined by weight change on water immersion (Experimental Mechanics of Fiber Reinforced Composite Materials by J. M. Whitney, O. M. Daniel and R. B. Pipes; Chapter 4.2.1, p 154).
[2] ASTM E-140
[3] ASTM D-790
[4] ASTM D-256
[5] ASTM D-638
[6] ASTM D-638
[7] Determined by measuring the weight gain of a sample immersed in a solvent at ambient temperature (static) for 6 days.

It is understood that various other modifications will be apparent also and can readily be made by those skilled in the art without departing from the scope and spirit of this invention. Accordingly, it is not intended that the scope of the claims appended hereto be limited to the description as set forth herein, but rather that the claims be construed as encompassing all the features of patentable novelty which reside in the present invention, including all the features which would be considered as equivalents thereof by those skilled in the art to which this invention pertains.

What is claimed is:

1. An isocyanate-modified poly(alkylene carbonate) polyahl which is a polymer comprising
    (1) a backbone having
        (a) the residue of at least one polyahl initiator;
        (b) the residue of at least one polyisocyanate;
        (c) a plurality of poly(alkyleneoxy) moieties;
        (d) a plurality of poly(alkylene carbonate) moieties; and
    (2) a plurality of active hydrogen end groups,
in an amount sufficient to act as reaction sites when the isocyanate-modified poly(alkylene carbonate) polyahls are advanced to higher molecular weights by heating under reduced pressure.

2. The isocyanate-modified poly(alkylene carbonate) polyahl of claim 1 wherein the isocyanate is an aliphatic, cycloaliphatic, araliphatic, aromatic or heterocyclic polyisocyanate or a combination thereof.

3. The isocyanate-modified poly(alkylene carbonate) polyahl of claim 2 wherein the isocyanate is selected from the group consisting of toluene diisocyanate, methylene bis(4-phenylisocyanate) and prepolymers of methylene bis(4-phenylisocyanate).

4. The isocyanate-modified poly(alkylene carbonate) polyahl of claim 1 wherein the poly(alkyleneoxy) moieties are poly(ethyleneoxy) moieties, poly(propyleneoxy) moieties or combinations thereof.

5. The isocyanate-modified poly(alkylene carbonate) polyahl of claim 1 wherein the poly(alkylene carbonate) moieties are poly(ethylene carbonate) moieties, poly(propylene carbonate) moieties, poly(butylene carbonate) moieties or combinations thereof.

6. The isocyanate-modified poly(alkylene carbonate) polyahl of claim 1 wherein the weight percent of isocyanate used to make the modified polyahl is from 1 to 25 percent.

7. The isocyanate-modified poly(alkylene carbonate) polyahl of claim 1 wherein the number average molecular weight is from 400 to 20,000.

8. The isocyanate-modified poly(alkylene carbonate) polyahl of claim 1 wherein the active hydrogen end groups are hydroxyl groups.

9. The isocyanate-modified poly(alkylene carbonate) polyahl of claim 1 wherein the polyahl is a diahl.

10. The isocyanate-modified poly(alkylene carbonate) diahl of claim 9 wherein the diahl is a diol.

11. The isocyanate-modified poly(alkylene carbonate) polyahl of claim 1 which is a random polymer corresponding to the formula

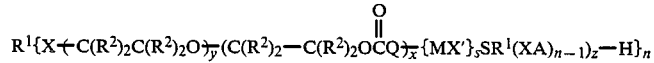

wherein $R^1$ is separately in each occurence an n-valent hydrocarbon radical or hydrocarbon radical which can contain one or more heteroatoms of O, N or S;

$R^2$ is separately in each occurrence hydrogen, halogen, a nitro group, a cyano group, a $C_{1-20}$ hydrocarbyl group or a $C_{1-20}$ hydrocarbyl group substituted with one or more halo, cyano, nitro, thioalkyl, tert-amino, alkoxy, aryloxy, aralkoxy, carbonyldioxyalkyl, carbonyldioxyaryl, carbonyldioxyaralkyl, alkoxycarbonyl, aryloxycarbonyl, aralkoxycarbonyl, alkylcarbonyl, arylcarbonyl, aralkylcarbonyl, alkylsulfinyl, arylsulfinyl, aralkylsulfinyl, alkylsulfonyl, arylsulfonyl, or aralkylsulfonyl group;

M is separately in each occurrence the residue of an aliphatic, cycloaliphatic, araliphatic, aromatic or heterocyclic polyisocyanate or a combination thereof;

X is separately in each occurrence S, O, NH,

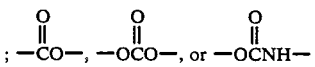

X' is separately in each occurrence S, O or NH;

A is separately in each occurrence

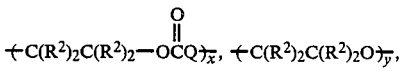

combinations thereof or a covalent bond;

Q is separately in each occurrence O, S or NH provided that all carbonate moieties are internal;

n is separately in each occurrence an integer of from 1 to 25;

s is separately in each occurrence an integer of from 1 to 5;

x is separately in each occurrence an integer of from 1 to 40;

y is separately in each occurence an integer of from 1 to 120; and z is separately in each occurrence an integer of from 0 to 5.

12. The isocyanate-modified poly(alkylene carbonate) polyahl of claim 11 wherein M is the residue of a polyisocyanate selected from the group consisting of toluene diisocyanate, methylene bis(4-phenylisocyanate), and prepolymers of methylene bis(4-phenylisocyanate), and combinations thereof;

X is oxygen;

x is separately in each occurrence an integer from 2 to 10;

y is separately in each occurrence an integer from 5 to 15; and z is an integer from 0 to 2, provided that the ratio of y to x is from 1:1 to 3:1.

13. The isocyanate-modified poly(alkylene carbonate) polyahl of claim 12 wherein $R^1$ is aliphatic or cycloaliphatic hydrocarbon containing one or more oxygen, nitrogen, or sulfur moieties;

$R^2$ is hydrogen, $C_{1-20}$ alkyl, $C_{1-20}$ haloalkyl, $C_{1-20}$ alkenyl or phenyl;

X is S, O or NH; and n is an integer from 1 to 10.

14. The isocyanate-modified poly(alkylene carbonate) polyahl of claim 13 wherein
$R^1$ is an n-valent alkane or cycloalkane, or an n-valent alkane or cycloalkane containing one or more oxygen, nitrogen or sulfur moieties;
$R^2$ is hydrogen, methyl or ethyl;
X is O;
X' is O;
n is an integer from 1 to 5; and
s is an integer from 1 to 3.

15. The isocyanate-modified poly(alkylene carbonate) polyahl of claim 14 wherein
$R^1$ is an n-valent $C_{1-10}$ alkane or an n-valent $C_{1-10}$ alkane substituted with one or more oxygen moieties;
$R^2$ is hydrogen or methyl; and
n is 1 or 2.

16. The isocyanate-modified poly(alkylene carbonate) polyahl of claim 15 wherein $R^2$ is hydrogen.

17. The isocyanate-modified poly(alkylene carbonate) polyahl of claim 16 wherein said modifier is selected from the group consisting of diols, triols and polyether polyols containing two or more hydroxy functional groups.

18. The isocyanate-modified poly(alkylene carbonate) polyahl of claim 11 wherein the weight percent of isocyanate used to make the modified polyahl is from 1 to 25 percent.

19. The isocyanate-modified poly(alkylene carbonate) polyahl of claim 11 wherein the number average molecular weight is from 400 to 20,000.

20. The isocyanate-modified poly(alkylene carbonate) polyahl of claim 8 which is a random polymer corresponding to the formula

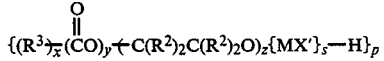

wherein
$R^3$ is $R^4\text{-}X'_n$;
$R^2$ is separately in each occurrence hydrogen, halogen, a nitro group, a cyano group, a $C_{1-20}$ hydrocarbyl group or a $C_{1-20}$ hydrocarbyl group substituted with one or more halogen, cyano, nitro, thioalkyl, tert-amino, alkoxy, aryloxy, aralkoxy, carbonyldioxyalkyl, carbonyldioxyaryl, carbonyldioxyaralkyl, alkoxycarbonyl, aryloxycarbonyl, aralkoxycarbonyl, alkylcarbonyl, arylcarbonyl, aralkylcarbonyl, alkylsulfinyl, arylsulfinyl, aralkylsulfinyl, alkylsulfonyl, arylsulfonyl, or aralkylsulfonyl group;
$R^3$ is separately in each occurrence an n-valent hydrocarbon radical or hydrocarbon radical which contains one or more heteroatoms of O, N or S;
M is separately in each occurrence the residue of an aliphatic, cycloaliphatic, araliphatic, aromatic or heterocyclic polyisocyanate or a combination thereof;
X' is O, S or NH;
n is separately in each occurrence an integer of from 1 to 25;
p is an integer of 1 or greater;
s is separately in each occurrence an integer of 1 to 5;
x is 1;
y is separately in each occurrence 1 to 40; and
z is separately in each occurrence 1 to 100.

21. The isocyanate-modified poly(alkylene carbonate) polyahl of claim 20 wherein
$R^2$ is hydrogen, $C_{1-20}$ alkyl, $C_{1-20}$ haloalkyl, $C_{1-20}$ alkenyl or phenyl;
$R^3$ is an aliphatic or cycloaliphatic hydrocarbon or an aliphatic or cycloaliphatic hydrocarbon containing one or more oxygen, sulfur or nitrogen moieties;
X' is S, O or NH;
n is an integer of 1 to 10, inclusive;
p is 1 to 10, inclusive;
y is 5 to 20, inclusive; and
z is 20 to 50, inclusive.

22. The isocyanate-modified poly(alkylene carbonate) polyahl of claim 21 wherein
$R^2$ is hydrogen, $C_{1-3}$ alkyl, $C_{2-3}$ alkenyl or phenyl;
$R^3$ is an n-valent alkane or cycloalkane or an n-valent alkane or cycloalkane containing an oxygen, sulfur or nitrogen moiety;
M is the residue of a polyisocyanate selected from the group consisting of toluene diisocyanate, methylene bis(4-phenylisocyanate) and prepolymers of methylene bis(4-phenylisocyanate);
n is an integer of 1 to 5, inclusive;
p is 1 to 5, inclusive; and
s is an integer of from 1 to 5, inclusive.

23. The isocyanate-modified poly(alkylene carbonate) polyahl of claim 22 wherein
$R^2$ is hydrogen, methyl or ethyl;
$R^3$ is an n-valent $C_{1-10}$ alkane containing oxygen moieties; and
n is 1 or 2.

24. The isocyanate-modified poly(alkylene carbonate) polyahl of claim 20 wherein the weight percent modifier is from 1 to 25 percent.

25. The isocyanate-modified poly(alkylene carbonate) polyahl of claim 24 wherein the number average molecular weight is from 400 to 20,000.

26. An isocyanate-functional prepolymer comprising the reaction product of at least one isocyanate-modified poly(alkylene carbonate) polyahl of claim 1 and at least one organic polyisocyanate; the proportion of said isocyanate-modified poly(alkylene carbonate) polyahl to said polyisocyanate being such that all polyahl moieties are reacted with isocyanate moieties and isocyanate moieties are present in excess.

27. A urethane/urea polymer comprising the residue of at least one isocyanate-functional prepolymer of claim 26 and the residue of at least one polyahl selected from the group consisting of aromatic, aliphatic, arylaliphatic, alkylaromatic and cycloaliphatic polyamines, polymercaptans and polyfunctional hydroxyl compounds.

28. A urethane/urea polymer comprising the residue of one or more of the isocyanate-modified poly(alkylene carbonate) polyahls of claim 1 and one or more organic polyisocyanates.

29. The isocyanate-modified poly(alkylene carbonate) polyahl of claim 1 wherein
(1) the poly(alkylene carbonate) moieties are present in sufficient amount to provide a sufficient proportion of carbonate moieties to enable the isocyanate-modified polyahl to react under heating at reduced pressure to increase the molecular weight of the isocyanate-modified polyahl; and
(2) the poly(alkyleneoxy) moieties are present in sufficient amount to increase the flexibility of polyurethane/urea polymers made from the isocyanate-modified poly(alkylene carbonate) polyahl.

* * * * *